United States Patent
Boer et al.

(10) Patent No.: US 9,027,892 B2
(45) Date of Patent: May 12, 2015

(54) ROTATING ELECTRONIC DISPLAY MOUNT

(71) Applicant: Rosemount Aerospace Inc., Burnsville, MN (US)

(72) Inventors: Jonathan L. Boer, Lakeville, MN (US); Kaleb Anderson, Goodhue, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 36 days.

(21) Appl. No.: 13/893,495

(22) Filed: May 14, 2013

(65) Prior Publication Data

US 2014/0339385 A1 Nov. 20, 2014

(51) Int. Cl.
*F16M 1/022* (2006.01)
*F16M 13/02* (2006.01)
*B64D 47/00* (2006.01)
*B64D 45/00* (2006.01)
*B60R 11/02* (2006.01)
*B60R 11/00* (2006.01)

(52) U.S. Cl.
CPC .............. *F16M 13/02* (2013.01); *B64D 47/00* (2013.01); *B64D 45/00* (2013.01); *B64D 2045/0075* (2013.01); *B60R 11/0235* (2013.01); *B60R 2011/0085* (2013.01)

(58) Field of Classification Search
CPC ................. F16M 13/02; F16M 13/022; F16M 2200/021; F16M 2200/024; F16M 2200/08; B64D 47/00
USPC ............. 248/220.21, 220.31, 220.41, 221.11, 248/222.12, 222.51, 222.52, 917, 919–923, 248/225.21
See application file for complete search history.

(56) References Cited

U.S. PATENT DOCUMENTS

| | | | |
|---|---|---|---|
| 815,627 A * | 3/1906 | Oldham | 285/84 |
| 2,283,974 A * | 5/1942 | Dillon | 285/18 |
| 3,229,948 A * | 1/1966 | King | 248/346.03 |
| 3,908,942 A * | 9/1975 | Keith et al. | 248/158 |
| 4,400,856 A * | 8/1983 | Tseng | 24/590.1 |
| 4,570,892 A | 2/1986 | Czech et al. | |
| 4,733,330 A * | 3/1988 | Tanaka et al. | 361/641 |
| 4,880,191 A * | 11/1989 | Lake, Jr. | 248/371 |
| 5,626,435 A * | 5/1997 | Wohlhuter | 403/348 |
| 6,220,557 B1 * | 4/2001 | Ziaylek et al. | 248/316.1 |
| 6,302,617 B1 * | 10/2001 | Rumpp | 403/348 |
| 6,588,719 B1 | 7/2003 | Tubach | |
| 6,929,226 B1 * | 8/2005 | Philistine | 248/222.52 |
| 7,100,879 B2 * | 9/2006 | Podue et al. | 248/220.31 |
| 7,303,171 B1 | 12/2007 | Chen | |
| 7,317,613 B2 * | 1/2008 | Quijano et al. | 361/679.41 |
| 7,506,850 B2 | 3/2009 | Chang | |
| 7,576,984 B2 * | 8/2009 | Chen et al. | 361/679.33 |
| 7,673,838 B2 * | 3/2010 | Oddsen et al. | 248/278.1 |
| 7,686,250 B2 | 3/2010 | Fortes et al. | |

(Continued)

*Primary Examiner* — Nkeisha Smith
(74) *Attorney, Agent, or Firm* — Locke Lord LLP; Scott D. Wofsy; Daniel J. Fiorello

(57) ABSTRACT

An assembly is disclosed for mounting an electronic display device to a supporting structure within the cockpit of an aircraft which includes a circular adapter plate configured for attachment to a rear surface of an electronic display device, the adapter plate having a central alignment aperture with an axially extending annular wall that faces away from the rear surface of the display device, and a receiver plate configured for attachment to a supporting structure within the cockpit of an aircraft, the receiver plate having a recessed port for blindly receiving the annular wall of the central alignment aperture of the adapter plate.

16 Claims, 5 Drawing Sheets

(56) References Cited

U.S. PATENT DOCUMENTS

| | | | |
|---|---|---|---|
| 7,832,775 B2 * | 11/2010 | Regener et al. | 285/377 |
| 7,929,284 B2 | 4/2011 | Shen | |
| 8,083,193 B2 * | 12/2011 | Matsui et al. | 248/221.11 |
| 8,191,844 B2 * | 6/2012 | Pennino | 248/222.52 |
| 8,215,583 B2 | 7/2012 | Groomes et al. | |
| 8,223,987 B2 * | 7/2012 | Shibata et al. | 381/87 |
| 8,308,114 B2 | 11/2012 | Debuhr et al. | |
| 8,382,050 B2 * | 2/2013 | Koop | 248/220.22 |
| 8,465,221 B2 * | 6/2013 | Yan et al. | 403/348 |
| 8,467,174 B2 * | 6/2013 | Weng et al. | 361/679.01 |
| 8,534,060 B1 * | 9/2013 | Bennett et al. | 60/458 |
| 2010/0243856 A1 * | 9/2010 | Coffield et al. | 248/560 |
| 2013/0062488 A1 * | 3/2013 | Chen | 248/222.14 |
| 2013/0094127 A1 * | 4/2013 | Lu | 361/679.01 |
| 2013/0233987 A1 * | 9/2013 | Sun | 248/221.11 |

* cited by examiner

ROTATING ELECTRONIC DISPLAY MOUNT

BACKGROUND OF THE INVENTION

1. Field of the Invention

The subject invention relates to improvements in mounts for portable electronic displays, and more particularly, to a blind rotating mounting assembly for a portable electronic flight bag (EFB) used within the cockpit of an aircraft.

2. Description of Related Art

An EFB is an electronic display device that a pilot may use for preflight check lists and similar activities. EFB's are generally handheld portable devices that a pilot can take from flight to flight. Information about a pilot's flight may be preloaded onto the EFB so that the pilot can access that information prior to, during and after the flight.

In the past, a pilot may have simply placed an EFB loosely within the cockpit of an airplane, e.g., on the floor or on a console, which could lead to problems during the flight. For example, the EFB could become lost among other items in the cockpit, or the position of the EFB could shift during the flight. Furthermore, if there is turbulence during a flight, the EFB could become damaged if it is not secured to a fixed surface within the cockpit.

Partially in response to these concerns, the U.S. Federal Aviation Administration (FAA) has published guidelines designating three separate classes of EFB hardware approved for use under progressively more demanding conditions. Specifically, Class 1 devices are standard commercial-off-the-shelf (COTS) equipment such as laptops or handheld electronic devices. These devices are used as loose equipment and are typically stowed during critical phases of flight.

A Class 1 EFB is considered a Portable Electronic Device (PED). These may connect to aircraft power and interface to other systems via certified (STC) docking station and/or power source. This would allow the Class 1 device to interface with other systems through the certified interface and other devices through an expansion port interface.

Class 2 devices are also PEDs, and range from modified COTS equipment to purpose-built devices. They are typically mounted in the aircraft with the display being viewable to the pilot during all phases of flight. Mounts can include certified structural mounting devices or kneeboard devices. These devices may connect to aircraft power and data sources, e.g. through an ARINC 429 interface. A Class 2 EFB can be used for bi-directional data communication with other aircraft systems. In this class, a single line replaceable unit (LRU) would be an optimal solution based on the ease of installation and replacement.

Class 3 devices are considered "installed equipment" and are subject to airworthiness requirements defined by the FAA. Unlike PEDs, these devices must be under design control. The hardware is subject to a limited number of RTCA DO-160E requirements (for non-essential equipment—typical crash safety and Conducted and Radiated Emissions (EMC) testing). There may also be certain requirements for software. Class 3 EFBs are typically installed under STC or other airworthiness approval.

Mounting brackets used for Class 3 hardware typically do not permit easy removal of the electronic equipment. Those mounting brackets that do permit easy removal or adjustment, require considerable manipulation with both hands, which can be distracting and inconvenient for the pilot.

It would be beneficial to provide a mounting assembly that allows for easy temporary installation of an EFB on a supporting console within the cockpit of an aircraft without the use of any tools, fasteners, complicated moving parts, actuators, or manual latches.

SUMMARY OF THE INVENTION

The subject invention is directed to a new and useful assembly for easily and blindly mounting an electronic display device to a supporting structure, such as a console, within the cockpit of an aircraft. The assembly includes a circular adapter plate configured for secure attachment to a rear surface of an electronic display device, and a square receiver plate configured for attachment to a supporting structure, such as a console, within the cockpit of an aircraft.

The adapter plate has a central alignment aperture with an axially extending annular wall that faces away from the rear surface of the display device to which it is attached. The adapter plate includes a plurality of circumferentially spaced apart engagement arms or spokes that extend radially outwardly from a peripheral edge of the adapter plate.

The receiver plate has a recessed port for blindly receiving the annular wall of the central alignment aperture of the adapter plate. The receiver plate includes a plurality of circumferentially spaced apart cantilevered retention tabs that extend in a direction tangential to the periphery of the recessed port.

Each retention tab of the receiver plate is adapted and configured to receive and temporarily retain a respective engagement arm of the adapter plate upon axial reception of the annular wall of the central alignment aperture of the adapter plate within the recessed port of the receiver plate and subsequent rotation of the adapter plate (i.e., the display device) relative to the receiver plate (i.e., the supporting structure). The rotational engagement of the engagement arms of the adapter plate by the retention tabs of the receiver plate renders the mounting assembly less susceptible to disengagement by vibration and shock experienced by the aircraft during flight operations.

Preferably, each of the radially outwardly extending engagement arms of the adapter plate includes a tangentially extending cantilevered projection having a detent formed thereon. Preferably, each of the cantilevered retention tabs of the receiver plate includes an upturned end section for accommodating relative movement of the detent formed on the cantilevered projection of an engagement arm of the adapter plate received thereby. Each of the cantilevered retention tabs of the receiver plate preferably includes a recess for temporarily receiving and retaining the detent formed on the cantilevered projection of an engagement arm of the adapter plate.

These and other features of the mounting assembly of the subject invention and the manner in which it is employed within the cockpit of an aircraft will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the mount assembly of the subject invention without undue experimentation, preferred embodiments thereof will be described in detail herein below with reference to certain figures, wherein:

FIG. 5 illustrates the engagement arms of the adapter plate fully engaged with the retention tabs of the receiver plate.

DETAILED DESCRIPTION OF PREFERRED EMBODIMENTS

Figure 1:
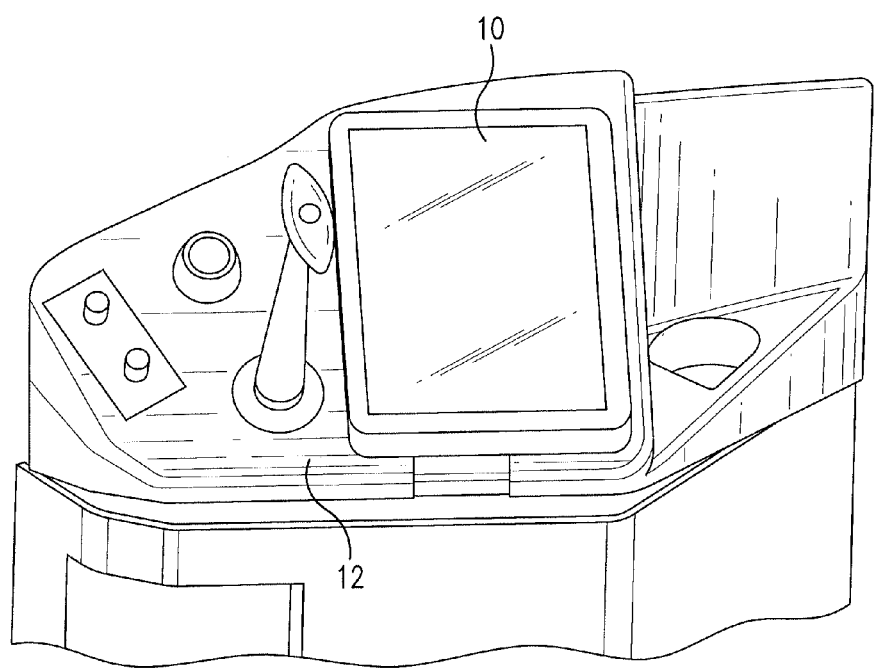
FIG. 1 shows an electronic display device mounted on a console in the cockpit of an aircraft.

Referring now to the drawings, wherein like reference numerals identify similar structural features or aspects of the subject invention, there is illustrated in FIG. 1 an electronic display device 10 that a pilot may use for preflight check lists and similar activities within the cockpit of an aircraft.

The electronic display device 10 is removably mounted to a supporting structure or console 12 in the cockpit of an aircraft using the mounting assembly of the subject invention, which is described in greater detail herein below. The mounting assembly of the subject invention enables a pilot or crewmember to easily and quickly mount the electronic display device 10 to a supporting structure or console 12 in the cockpit of an aircraft without using any tools or manually operated fasteners or latches.

Figure 2:
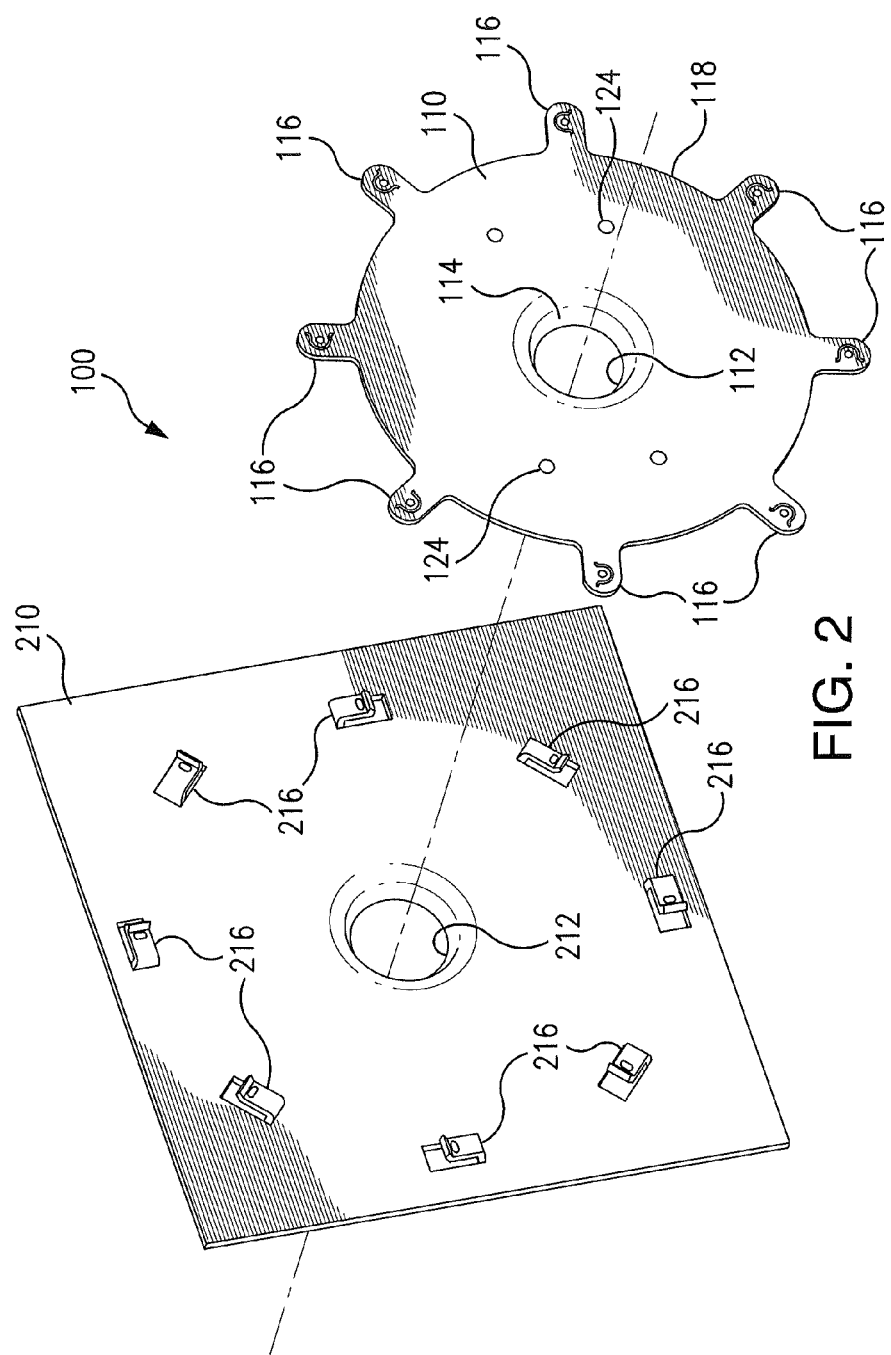
FIG. 2 is a perspective view of the blind rotating mounting assembly of the subject invention, which includes a circular adapter plate configured for attachment to a rear surface of an electronic display device, and a square receiver plate configured for attachment to a supporting structure or console within the cockpit of an aircraft.

Referring to FIG. 2, the mounting assembly of the subject invention, which his designated generally by reference numeral 100, includes a circular adapter plate 110 and a square receiver plate 210. The adapter plate 110 is configured for attachment to a rear surface of an electronic display device 10. The receiver plate 210 is configured for attachment to a supporting structure 12 in the cockpit of an aircraft. The adapter plate 110 and receiver plate 210 are preferably stamp formed from flat sheet metal, making this a low cost assembly to manufacture.

With continuing reference to FIG. 2, the adapter plate 110 has a central alignment aperture 112 with an axially extending annular wall 114 that faces away from the rear surface of the display device 10. The adapter plate 110 includes a plurality of circumferentially spaced apart spokes or engagement arms 116 that extend radially outwardly from a peripheral edge 118 of the adapter plate 110. By way of example, in the illustrated embodiment of the subject invention, the adapter plate 110 has eight radially extending spokes or engagement arms 116. Those skilled in the art will readily appreciate that the number of radially spokes can vary depending upon such factors as allowable diameter, assembly force desired, structural strength required or rotation angle allowed.

Figure 2B:
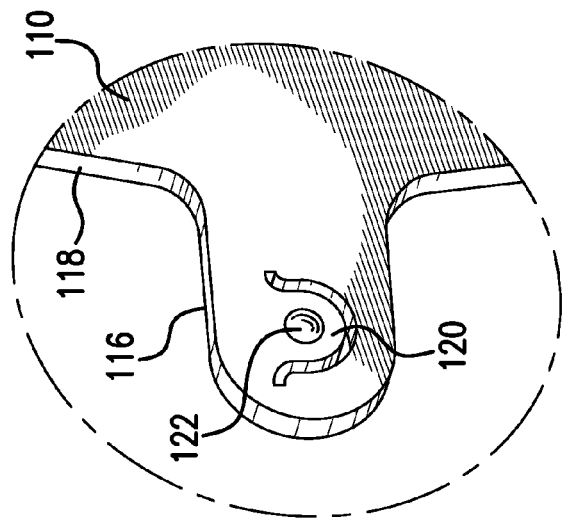
FIGS. 2A and 2B are enlarged localized views of the cooperating engagement structures provided on the adapter plate and receiver plate of the mounting assembly shown in FIG. 2.
Figure 3:
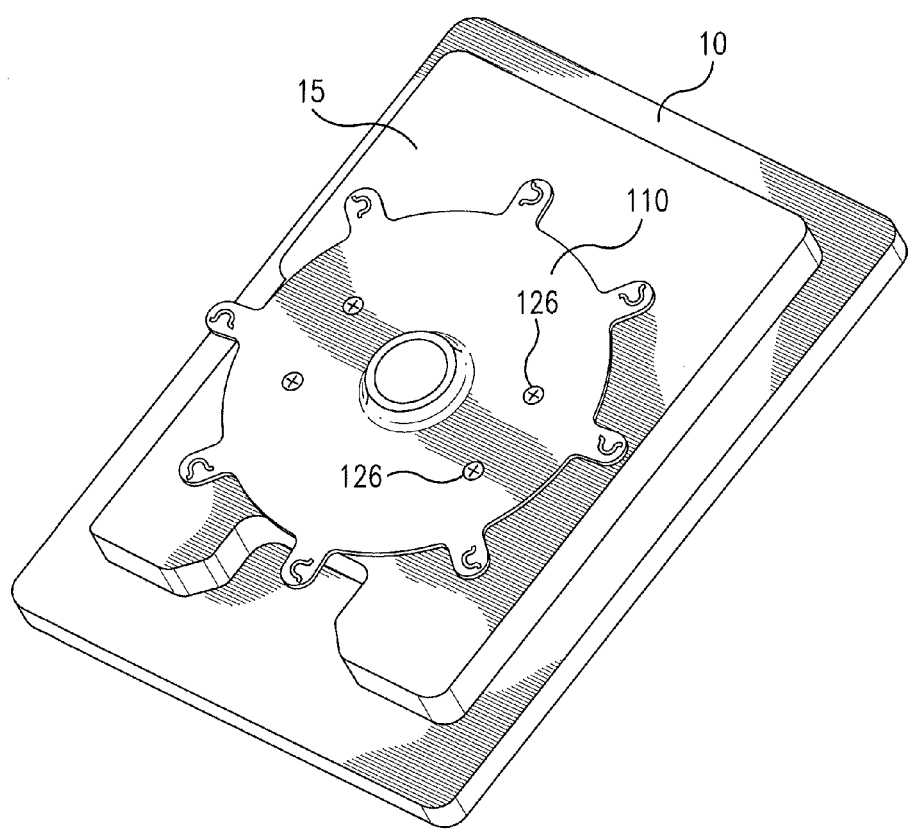
FIG. 3 illustrates the adapter plate of the mounting assembly shown in FIG. 1 attached to a rear surface of an electronic display device.

As best seen in FIG. 2B, each of the radially outwardly extending engagement arms 116 of the adapter plate 110 includes an integrally formed, tangentially extending cantilevered projection 120. Each cantilevered projection 120 has a raised detent or bump 122 formed thereon. The adapter plate 110 further includes a plurality of mounting apertures 124 for receiving threaded fasteners 126 that secure the adapter plate 110 to the rear surface 15 of the display device 10, as illustrated in FIG. 3.

The receiver plate 210 of mounting assembly 100 has a centrally located recessed port 212 for blindly receiving the annular wall 114 of the central alignment aperture 112 of the adapter plate 110. It is envisioned that the adapter plate 110 could be aligned with the receiver plate 210 in other ways. For example, one of the spokes 116 could be omitted or offset to allow for a certain assembly orientation, or a keyway could be formed in the annular wall 114 for aligning with complementary structure in recessed port 212.

The receiver plate 210 includes a plurality of circumferentially spaced apart cantilevered retention tabs 216 that extend in a direction tangential to the periphery of the recessed port 212. The cantilevered retention tabs 216 are preferably formed integral with the receiver plate 210. It is envisioned however, that the retention tabs could be formed separate from the plate and subsequently mounted to the plate using conventional metal joining techniques.

Figure 2A:
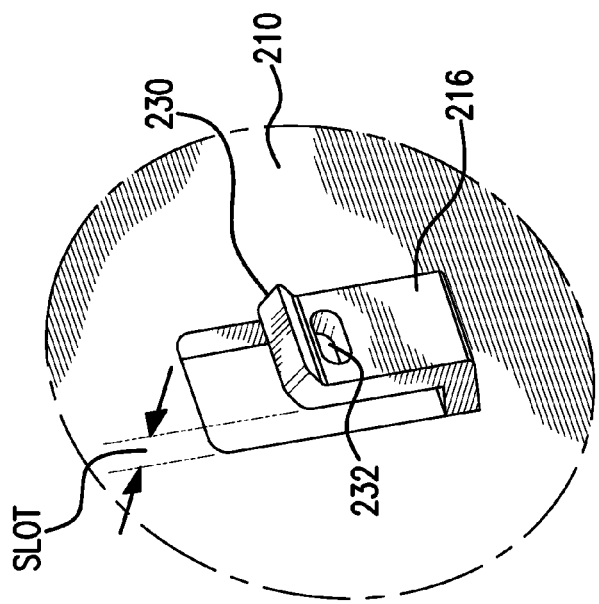

As best seen in FIG. 2A, each cantilevered retention tab 216 of the receiver plate 210 includes an upturned end section 230 for accommodating relative movement of a detent 122 formed on a cantilevered projection 118 of an engagement arm 116 of the adapter plate 110 received thereby. Each of the cantilevered retention tabs 216 of the receiver plate 210 also includes a recess or hole 232 for receiving and temporarily retaining or catching a detent 122 formed on a cantilevered projection 118 of an engagement arm 116 of the adapter plate 110.

Figure 4:
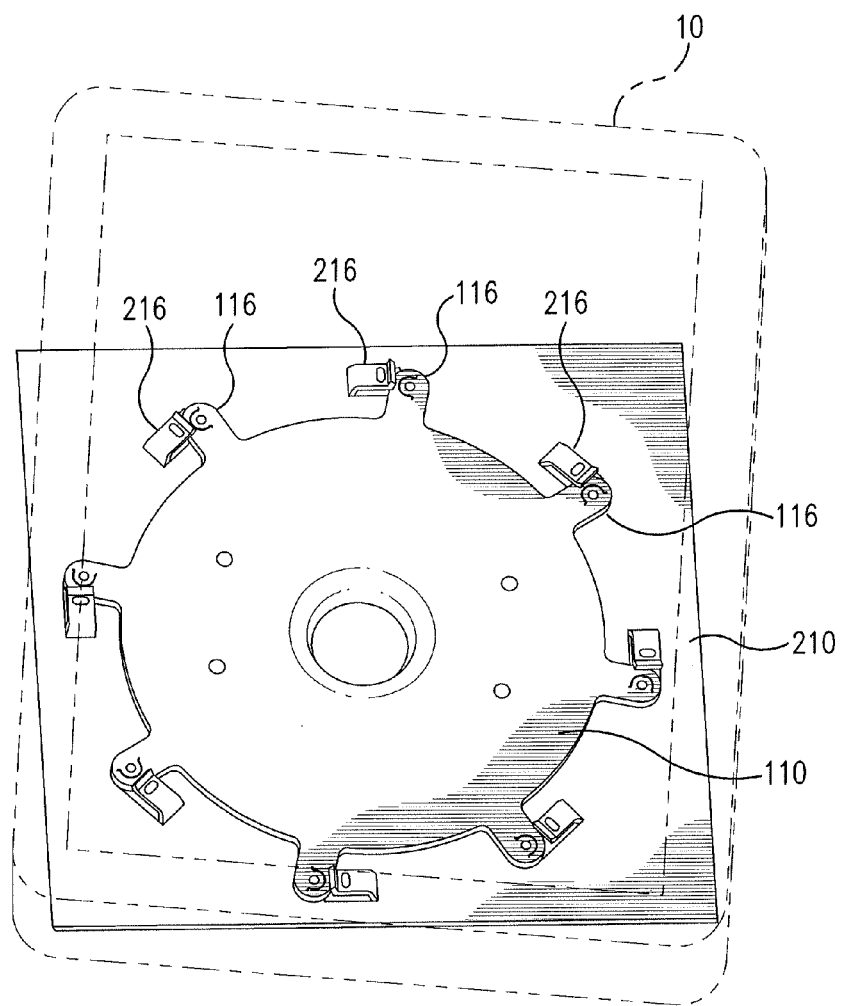
FIG. 4 illustrates the adapter plate axially aligned with the square receiver plate prior to rotating the adapter plate into engagement with the receiver plate.

In use, each retention tab 216 of the receiver plate 210 is adapted and configured to receive and temporarily retain a respective engagement arm 116 of the adapter plate 110 upon axial reception of the annular wall 114 of the central alignment aperture 112 of the adapter plate 110 within the recessed port 212 of the receiver plate 210, as shown in FIG. 4, followed by the subsequent rotation of the adapter plate 110 relative to the receiver plate 210, as shown in FIG. 5. During the rotational engagement of an engagement arm 116 with a retention tab 216, the detent 122 on the projection 118 slides past the upturned end 230 of the retention tab 216 and is captured by the recess 232 of the retention tab 216.

It should be appreciated by those skilled in the art that because the engagement forces between the engagement arms 116 of the adapter plate 110 and retention tabs 216 of receiver plate 210 are rotational, the mounting assembly 100 is less susceptible to disengagement by vibrations and shocks experienced on the aircraft during flight operations, which are typically applied along discrete axes.

Those skilled in the art will also appreciate that the number of engagement arms 116 on the adapter plate 110 and the corresponding number of retention tabs 216 on receiver plate 210 can vary depending upon the size of the adapter plate 110 and/or the display device 10 with which it is employed. It is also envisioned that alternative blind rotational engagement structure can be employed as an alternative to the cooperating engagement arms 116 and retention tabs 216 disclosed herein. For example, a plurality of spring biased engagement clips can be employed to releasably retain the adapter plate 110 with respect to the receiver plate 210.

While the subject invention has been shown and described with reference to preferred embodiments, those skilled in the art will readily appreciate that various changes and/or modifications may be made thereto without departing from the spirit and scope of the subject invention as defined by the appended claims.

For example, while the subject invention has been described with respect to a display device associated with an EFB, it is envisioned that the mounting assembly disclosed herein could be readily adapted for use in conjunction with any type of display device including, for example, televisions or computer monitors. In fact, the mounting assembly disclosed herein can be used in any situation where an electronic display device with significant mass needs to be mounted in a cavity where there is little or no access to a mount, and where the display device needs to be mounted without the use of any tools or manual latches.

What is claimed is:

1. An assembly for mounting an electronic display device to a supporting structure within a cockpit of an aircraft comprising:
   a) a circular adapter plate configured for attachment to a rear surface of an electronic display device, the adapter plate having a central alignment aperture with an axially extending annular wall that faces away from the rear surface of the display device; and
   b) a receiver plate configured for attachment to a supporting structure within the cockpit of an aircraft, the receiver plate having a recessed port for blindly receiving the annular wall of the central alignment aperture of the adapter plate wherein the adapter plate includes a plurality of circumferentially spaced apart engagement arms extending radially outwardly from a peripheral edge of the adapter plate, wherein the receiver plate includes a plurality of circumferentially spaced apart cantilevered retention tabs each defining a slot located between a tab body and a plane of the receiver plate, the slot opening in a direction tangential to a periphery of the recessed port such that at least one of the circumferentially spaced engagement arms can enter into a slot and be prevented from further rotation by a respective retention tab.

2. An assembly as recited in claim 1, wherein each cantilevered retention tab is adapted and configured to receive and temporarily retain a respective engagement arm of the adapter plate upon axial reception of the annular wall of the central alignment aperture of the adapter plate within the recessed port of the receiver plate and subsequent rotation of the display device relative to the supporting structure.

3. An assembly as recited in claim 1, wherein each of the radially outwardly extending engagement arms of the adapter plate includes a tangentially extending cantilevered projection having a detent formed thereon.

4. An assembly as recited in claim 1, wherein each of the cantilevered retention tabs of the receiver plate includes an upturned end section.

5. An assembly as recited in claim 1, wherein each of the cantilevered retention tabs of the receiver plate includes a recess for temporarily receiving and retaining a detent formed on a cantilevered projection of an engagement arm.

6. An assembly as recited in claim 1, wherein a plurality of mounting holes are provided in the adapter plate for securing the adapter plate to the rear surface of the electronic display device with fasteners.

7. An assembly for mounting an electronic display device to a supporting structure within a cockpit of an aircraft comprising:
   a) a circular adapter plate configured for attachment to a rear surface of an electronic display device, the adapter plate including a plurality of circumferentially spaced apart engagement arms extending radially outwardly from a peripheral edge of the adapter plate wherein the adapter plate has a central alignment aperture with an axially extending annular wall that faces away from the rear surface of the display device; and
   b) a receiver plate configured for attachment to a supporting structure within the cockpit of an aircraft, wherein the receiver plate includes a recessed port for blindly receiving the annular wall of the central alignment aperture of the adapter plate the receiver plate including a plurality of circumferentially spaced apart cantilevered retention tabs each defining a slot located between a tab body and a plane of the receiver plate, the slot opening in a direction tangential to a periphery of the recessed port such that at least one of the circumferentially spaced engagement arms can enter into a slot and be prevented from further rotation by a respective retention tab, wherein each retention tab is adapted and configured to receive and temporarily retain a respective engagement arm of the adapter plate upon rotation of the display device relative to the supporting structure.

8. An assembly as recited in claim 7, wherein each of the radially outwardly extending engagement arms of the adapter plate includes a tangentially extending cantilevered projection having a detent formed thereon.

9. An assembly as recited in claim 7, wherein each of the cantilevered retention tabs of the receiver plate includes an upturned end section for accommodating relative movement of a detent formed on a cantilevered projection of an engagement arm of the adapter plate received thereby.

10. An assembly as recited in claim 9, wherein each of the cantilevered retention tabs of the receiver plate includes a recess for temporarily receiving and retaining a detent formed on a cantilevered projection of an engagement arm of the adapter plate.

11. An assembly as recited in claim 7, wherein a plurality of mounting holes are provided in the adapter plate for securing the adapter plate to the rear surface of the electronic display device with fasteners.

12. An assembly for mounting an electronic display device to a supporting structure within a cockpit of an aircraft comprising:
   a) a circular adapter plate configured for attachment to a rear surface of an electronic display device, the adapter plate having a central alignment aperture with an axially extending annular wall that faces away from the rear surface of the display device, and including a plurality of circumferentially spaced apart engagement arms extending radially outwardly from a peripheral edge of the adapter plate; and
   b) a receiver plate configured for attachment to a supporting structure within the cockpit of an aircraft, the receiver plate having a recessed port for slidably receiving the annular wall of the central alignment aperture of the adapter plate, and including a plurality of circumferentially spaced apart cantilevered retention tabs each defining a slot located between a tab body and a plane of the receiver plate, the slot opening in a direction tangential to a periphery of the recessed port such that at least one of the circumferentially spaced engagement arms can enter into a slot and be prevented from further rotation by a respective retention tab, wherein each retention tab is adapted and configured to receive and temporarily retain a respective engagement arm of the adapter plate upon axial reception of the annular wall of the central alignment aperture of the adapter plate within the recessed port of the receiver plate and subsequent rotation of the display device relative to the supporting structure.

13. An assembly as recited in claim 12, wherein each of the radially outwardly extending engagement arms of the adapter plate includes a tangentially extending cantilevered projection having a detent formed thereon.

14. An assembly as recited in claim 13, wherein each of the cantilevered retention tabs of the receiver plate includes an upturned end section for accommodating relative movement of a detent formed on a cantilevered projection of an engagement arm of the adapter plate received thereby.

15. An assembly as recited in claim 13, wherein each of the cantilevered retention tabs of the receiver plate includes a recess for temporarily receiving and retaining a detent formed on a cantilevered projection of an engagement arm of the adapter plate.

16. An assembly as recited in claim 12, wherein rotational engagement of the engagement arms of the adapter plate by the retention tabs of the receiver plate renders the mounting assembly less susceptible to disengagement by vibration and shock experienced by the aircraft during flight operations.

* * * * *